(12) United States Patent
Porte et al.

(10) Patent No.: US 10,377,503 B2
(45) Date of Patent: Aug. 13, 2019

(54) ENGINE ASSEMBLY OF AN AIRCRAFT INCLUDING A DISPLAY UNIT

(71) Applicant: Airbus Operations (SAS), Toulouse (FR)

(72) Inventors: Alain Porte, Colomiers (FR); Frederic Chelin, Encausse (FR); Wolfgang Rehm, Hergensweiler (DE); Nathalie Papin, Colomiers (FR); Irene Moreno Gonzalez, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 551 days.

(21) Appl. No.: 15/171,171

(22) Filed: Jun. 2, 2016

(65) Prior Publication Data

US 2016/0355276 A1 Dec. 8, 2016

(30) Foreign Application Priority Data

Jun. 5, 2015 (FR) ...................... 15 55115

(51) Int. Cl.
*B64D 27/10* (2006.01)
*B64D 47/00* (2006.01)
*G09F 19/18* (2006.01)
*G09F 21/10* (2006.01)
*F01D 25/24* (2006.01)
(Continued)

(52) U.S. Cl.
CPC ............. *B64D 47/00* (2013.01); *B64D 27/10* (2013.01); *F01D 25/24* (2013.01); *F02C 7/04* (2013.01); *F04D 27/001* (2013.01); *F04D 29/325* (2013.01); *F04D 29/38* (2013.01);
(Continued)

*G09F 19/18* (2013.01); *G09F 21/10* (2013.01); *F05D 2220/323* (2013.01)

(58) Field of Classification Search
None
See application file for complete search history.

(56) References Cited

U.S. PATENT DOCUMENTS 4,066,890 A * 1/1978 Hamilton ............... B64D 47/06
340/946
4,736,907 A * 4/1988 Steffen .................. B64D 45/00
244/1 R (Continued)

FOREIGN PATENT DOCUMENTS

| EP | 2549329 | 1/2013 |
| FR | 2982736 | 5/2013 |
| FR | 3002360 | 8/2014 |

OTHER PUBLICATIONS

French Search Report, dated Apr. 14, 2016, priority document.

*Primary Examiner* — Carlos A Rivera
*Assistant Examiner* — Theodore C Ribadeneyra
(74) *Attorney, Agent, or Firm* — Greer, Burns & Crain, Ltd.

(57) ABSTRACT

An engine assembly comprising an engine and a pod surrounding the engine that is equipped, upstream according to the direction of entry of air into the engine, with a fan provided with blades, the pod having an upstream air intake. The engine assembly also comprises a display unit including at least one light ring arranged in the air intake upstream of the fan, the light ring including at least one row of light-emitting diodes and being configured to emit at least one light beam and to project it on the blades of the fan.

11 Claims, 3 Drawing Sheets

(51) Int. Cl.
*F02C 7/04* (2006.01)
*F04D 27/00* (2006.01)
*F04D 29/32* (2006.01)
*F04D 29/38* (2006.01)

(56) References Cited

U.S. PATENT DOCUMENTS

| | | | | |
|---|---|---|---|---|
| 5,813,744 | A * | 9/1998 | Altebarmakian | B64D 47/04 244/1 R |
| 6,779,908 | B1 * | 8/2004 | Ng | F21S 8/02 362/147 |
| 7,175,321 | B1 * | 2/2007 | Lopez | B60Q 1/50 296/21 |
| 7,645,053 | B2 * | 1/2010 | MacHi | B64D 47/06 362/241 |
| 8,164,462 | B1 | 4/2012 | Bose et al. | |
| 8,933,819 | B1 * | 1/2015 | Garrettson | B64D 45/00 340/945 |
| 2005/0045762 | A1 * | 3/2005 | Pham | B64C 27/26 244/7 R |
| 2005/0213342 | A1 * | 9/2005 | Tufte | G09F 13/20 362/551 |
| 2007/0109799 | A1 * | 5/2007 | Kaeser | F21S 8/02 362/428 |
| 2008/0055285 | A1 * | 3/2008 | Ishikawa | G09F 21/045 345/204 |
| 2010/0079729 | A1 * | 4/2010 | Scanlon | G03B 21/00 353/13 |
| 2011/0134397 | A1 * | 6/2011 | Kayser | G03B 21/14 353/62 |
| 2011/0188257 | A1 * | 8/2011 | Sidler | B64D 47/02 362/470 |
| 2012/0212712 | A1 | 8/2012 | Scanlon | |
| 2012/0327378 | A1 | 12/2012 | Harvey et al. | |
| 2014/0318474 | A1 * | 10/2014 | Papin | A01M 29/06 119/713 |
| 2016/0029615 | A1 * | 2/2016 | Newcamp | A01M 29/10 119/713 |
| 2018/0000062 | A1 * | 10/2018 | Khawam | A01M 29/10 |

* cited by examiner

ENGINE ASSEMBLY OF AN AIRCRAFT INCLUDING A DISPLAY UNIT

CROSS-REFERENCES TO RELATED APPLICATIONS

This application claims the benefit of the French patent application No. 1555115 filed on Jun. 5, 2015, the entire disclosures of which are incorporated herein by way of reference.

BACKGROUND OF THE INVENTION

This invention relates to an engine assembly of an aircraft including a display unit, the engine assembly comprising an engine and a pod surrounding the engine.

A device is known through document FR-3 002 360 for displaying images on an outside part of a mobile vehicle, and notably an aircraft. This display device comprises at least one laser source, which is capable of generating a light, spatially and temporally coherent, and which is configured to project at least one dynamic image on an outside part of the mobile vehicle, in particular on the fuselage of an aircraft or on the air intake of an engine of the aircraft. In the case of a display on an engine, the laser source is planned to be arranged on the fuselage, near the junction with the wing. The laser source is thus distanced from the engine and the laser beam emitted can be disturbed during its trajectory.

A device is known through document FR-2 982 736 for visually scaring avian species including a display unit, notably allowing this disadvantage to be partially remedied. This display unit comprises means for generating a visual signal including an image, of a size, variable over time, which simulates an approach by increasing the size of the image. In a particular embodiment, the means generate a visual signal representing eyes, while emitting images onto the two engines of a twin-engine aircraft.

To do this, this document FR-2 982 736 notably plans to arrange, at the engine air intakes or engine cowls, equipment of the means of emitting a visual signal, these means being configured so as to project images on the engine vanes.

However, this document FR-2 982 736 does not indicate how the means of emitting a visual signal are embodied and arranged on the air intakes or cowls of the engines.

Such an embodiment and such an arrangement are not easy to implement, notably to be effective and optimum relative to the envisaged utilization. In fact, the arrangement must take account of the configuration of the air intake and of the engine and the means of emission must not become a disturbance, in particular for the airflow entering through the air intake.

SUMMARY OF THE INVENTION

An object of this invention is to provide an optimum embodiment and arrangement of a display unit. It relates to an engine assembly comprising an engine and a pod surrounding the engine, the engine being equipped, upstream in the direction of entry of air into the engine, with a fan provided with blades, the pod having upstream an air intake, the air intake being arranged upstream of the fan, the engine assembly comprising at least one display unit arranged in the air intake.

According to the invention, the display unit includes at least one light ring arranged in the air intake upstream of the fan, the light ring including at least one row of light-emitting diodes and being configured to emit at least one light beam and to project it on the blades of the fan.

The light-emitting diodes (LED), are thus positioned in the form of ring(s) inside the pod of the engine assembly, and are oriented such that the generated light beam illuminates the blades of the fan and is reflected by these blades to the front of the engine.

Thus, thanks on one hand to the embodiment of the display unit in the form of light rings arranged in the air intake, which makes it possible to generate, in an effective manner, a display on the blades of the fan, and thanks on the other to the integration of light rings inside the air intake of the pod, which makes it possible to avoid any disturbance of flow, an optimum embodiment and an optimum arrangement of the display unit are obtained.

According to different embodiments of the invention, which can be taken together or separately:

- each row of the light ring includes a plurality of optical units, each of the optical units including a group of light-emitting diodes;
- each of the optical units includes at least four light-emitting diodes;
- each of the optical units includes a common electronic card, on which are mounted all the light-emitting diodes of the corresponding optical unit;
- each of the optical units includes a lens configured to manage the orientation of a light beam emitted by the light-emitting diodes of the corresponding optical unit;
- each of the optical units includes a cooling unit.

In a first embodiment, the display unit includes at least one light ring, which is arranged in an acoustic panel of the air intake.

Moreover, in a second embodiment, the display unit includes two light rings arranged, respectively, upstream and towards downstream of an acoustic panel of the air intake.

Furthermore, advantageously, the display unit includes in addition:

- a control unit;
- a source of electric power for the display unit; and
- an activating unit allowing an operator to act on the control unit.

Furthermore, advantageously, the engine assembly comprises at least one window which is transparent to the light beam emitted by the light-emitting diodes, the window being arranged on an outside face of the air intake facing the fan of the engine, the light-emitting diodes being arranged in the thickness of the air intake and configured to be able to emit a light beam through this window.

This invention further relates to an aircraft, in particular, a transport aircraft, which comprises at least one engine assembly such as the aforementioned.

Different applications are possible with a display unit such as described above, and in particular, bird scaring (on takeoff and landing), displaying information, identifying aircraft, notably in overcast weather, detecting defects on the blades of the fan, etc.

BRIEF DESCRIPTION OF THE DRAWINGS

The attached figures will bring good understanding of how the invention can be embodied. On these figures, identical references designate similar elements.

DETAILED DESCRIPTION OF THE PREFERRED EMBODIMENTS

Figure 1:
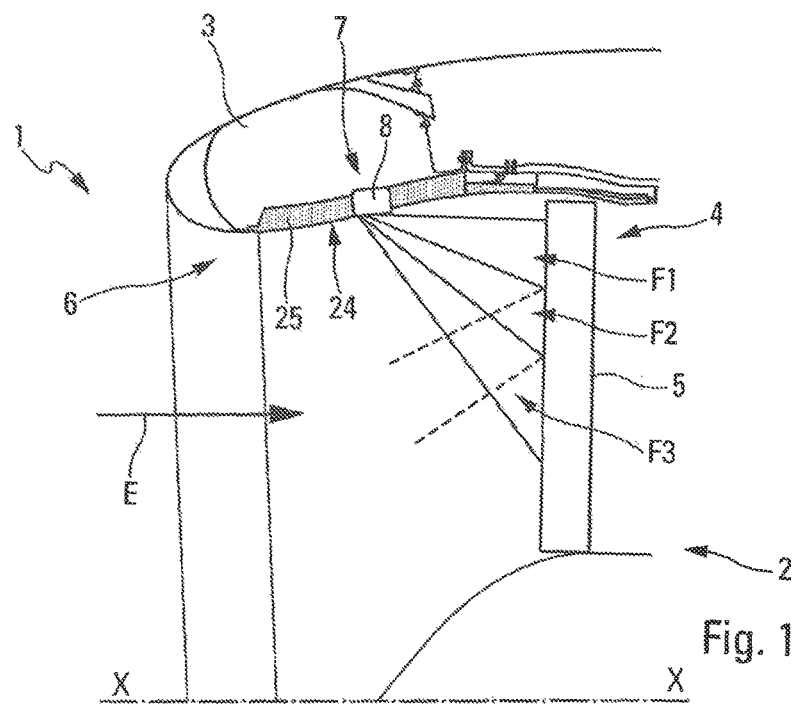
FIGS. 1 and 2 are schematic partial sections of an engine assembly comprising an engine and a pod to which the invention is applied.
Figure 2:
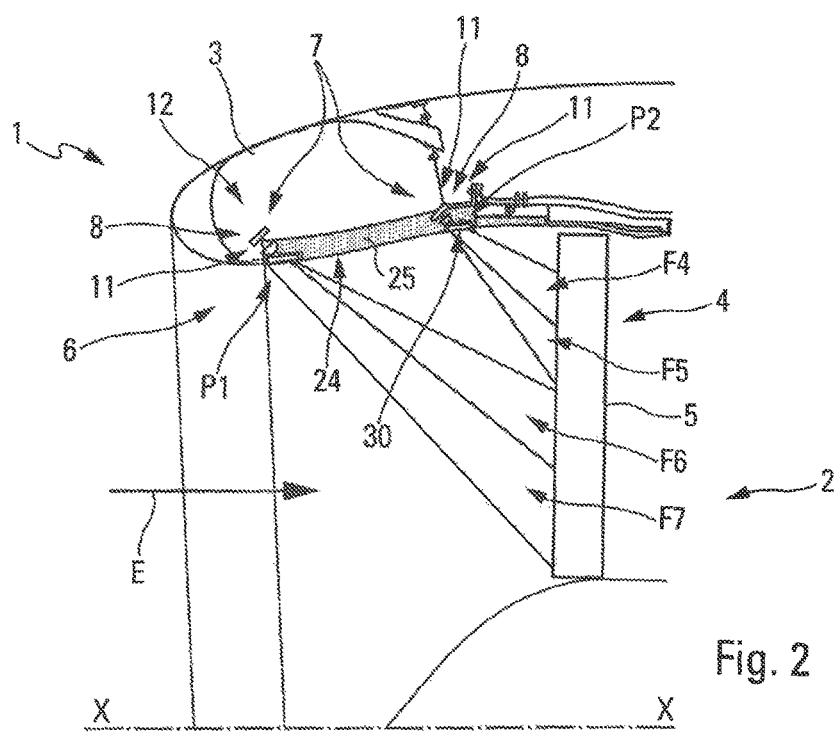

FIGS. 1 and 2 schematically and partially show an engine assembly 1 of an aircraft (not represented), in particular of a transport aircraft, illustrating the invention. The engine assembly 1 comprises, in a conventional manner, an engine 2 and a pod 3 surrounding the engine 2.

Within the framework of this invention, the terms "upstream" and "downstream" are defined in relation to the direction of the air in the engine 2, which is illustrated by an arrow E on FIGS. 1 and 2.

The engine 2 of axis X-X is equipped, in a conventional manner, upstream, with a fan 4 provided with blades 5, a single blade 5 being represented in the schematic partial sectional view of FIGS. 1 and 2. The other elements of the engine 2, of conventional type, are not further described.

The pod 3, which is, for example, intended to be fastened under a wing (not illustrated) of the aircraft, is provided, in a conventional manner, upstream of an air intake 6, as represented on FIGS. 1 and 2. This air intake 6 is positioned upstream of the fan 4. The air enters through this air intake 6 before reaching the fan of the engine 2, in the direction indicated by the arrow E.

According to the invention:
the engine assembly 1 is provided with a display unit 7;
this display unit 7 includes at least one light ring 8 arranged in the air intake 6, upstream of the fan 4;
the light ring 8 includes at least one row of light-emitting diodes 10 (FIG. 4) and is configured to emit at least one light beam F1 to F3 (FIG. 1) and F4 to F7 (FIG. 2) and to project it on the blades 5 of the fan 4.

Each row of a light ring 8 includes a plurality of optical units 11. Each of the optical units 11 includes a group of light-emitting diodes 10.

The light-emitting diodes 10 (LED) are thus positioned in the form of a ring or rings 8 inside the pod 3, and they are oriented such that the generated light beam F1 to F7 is directed onto the blades 5 of the fan 4. This light beam F1 to F7 is reflected by these blades 5 to the front (upstream) of the engine 2 and therefore of the aircraft equipped with the engine 2, as illustrated by dashes for the beam F2 of FIG. 1 (and only for this beam F2 so as not to overload FIG. 1).

The illumination and display generated on the blades 5 of the fan of the engine 2 of the aircraft can thus be seen by a human being or animal viewing the engines while being situated substantially forward of the aircraft, or can be detected by a detection device.

Of course, this invention can be applied to just one engine of the aircraft or to a plurality of engines, and notably to the set of the engines of the aircraft.

Figure 3:
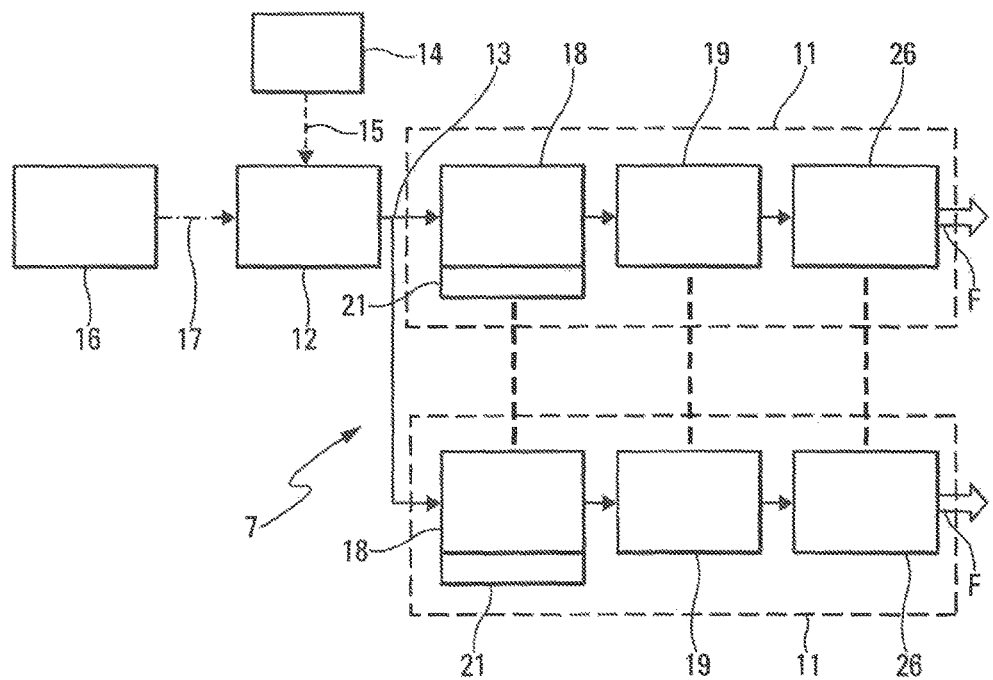
FIG. 3 is the block diagram of an embodiment of a display unit, making it possible to illustrate the invention.

Furthermore, the display unit 7 also comprises, in addition to the plurality of optical units 11, as represented on FIG. 3:
a control unit 12 (or microcontroller), which is linked via a link 13 to the optical units 11, and which is intended to control these optical units 11;
an actuating (or activating) unit 14, which is linked via a link 15 (which is wired (a signal of the wave or electric type), or not wired (WiFi or other)) to the control unit 12, and which allows an operator, in particular the pilot of the aircraft, to act on the control unit 12 to control the display; and
at least one source of electric power 16 for the display unit 7, which provides an electric power supply as illustrated very diagrammatically by an arrow 17 as a mixed dotted line.

The control unit 12 can be located in the structure of the air intake, near the light rings 8.

As for the actuating unit 14, which is preferably installed on the aircraft flight deck, it can be of a mechanical type, including, for example, keys and/or buttons, and/or of an electronic type, including, for example, a touchpad and/or conventional means of moving a cursor. This actuating unit 14 notably allows an operator, depending on the envisaged application:
to switch the display unit 7 on and off; and/or
to modify the characteristics of an image displayed via the display unit 7, such as its size or the frequency of its display (if it is not permanently displayed); and/or
to select an image to display among predefined images.

Moreover, the source of electric power 16 can be a conventional source, already existing on the aircraft, or else a dedicated source.

The light rings 8 are therefore formed of rows of light-emitting diodes grouped on the optical units 11.

Figure 4:
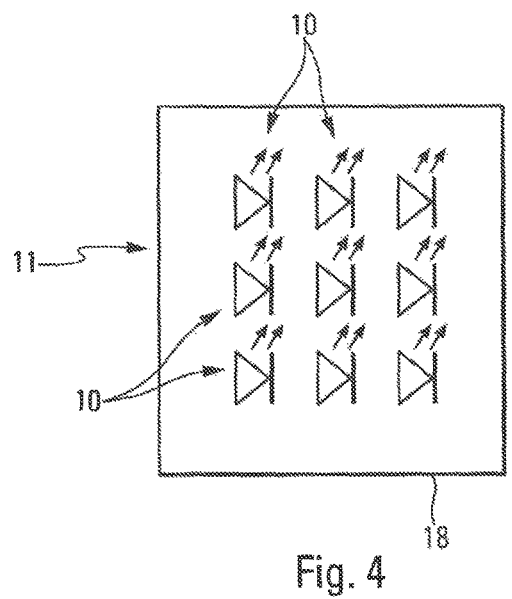
FIG. 4 schematically shows an electronic card of an optical unit provided with a group of light-emitting diodes.

Each optical unit 11 comprises a group (or "cluster") of light-emitting diodes 10, as represented on FIG. 4, preferably at least four light-emitting diodes.

In the case, notably, of diffusing an image in order to scare birds, such as specified above, in a particular embodiment, a minimum of nine light-emitting diodes is planned for each optical unit 11, as represented in the example of FIG. 4, in order to obtain optimum resolution.

Moreover, within a same optical unit 11, the different light-emitting diodes 10 are combined on a common electronic card 18 of the printed circuit board (PCB) type, as shown on FIG. 4.

Furthermore, as represented on FIG. 3, each optical unit 11 includes a lens 19 configured to manage the orientation of a light beam emitted by the light-emitting diodes of the optical unit 11, as well as other optical properties, for example, increasing the size of the image or focusing.

Figure 5:
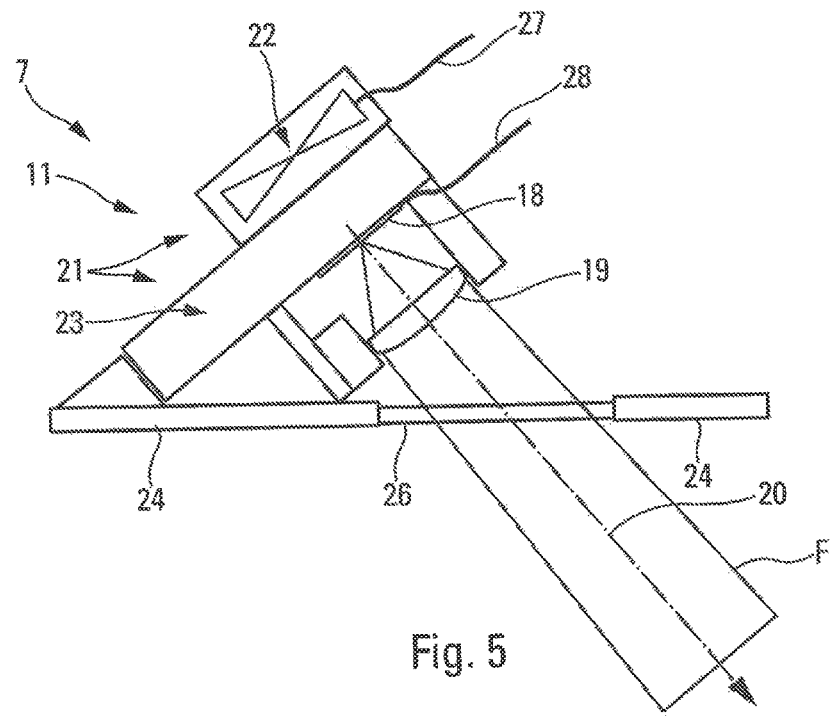
FIGS. 5 and 6 show, schematically and partially, respectively, different embodiments of an optical unit.
Figure 6:
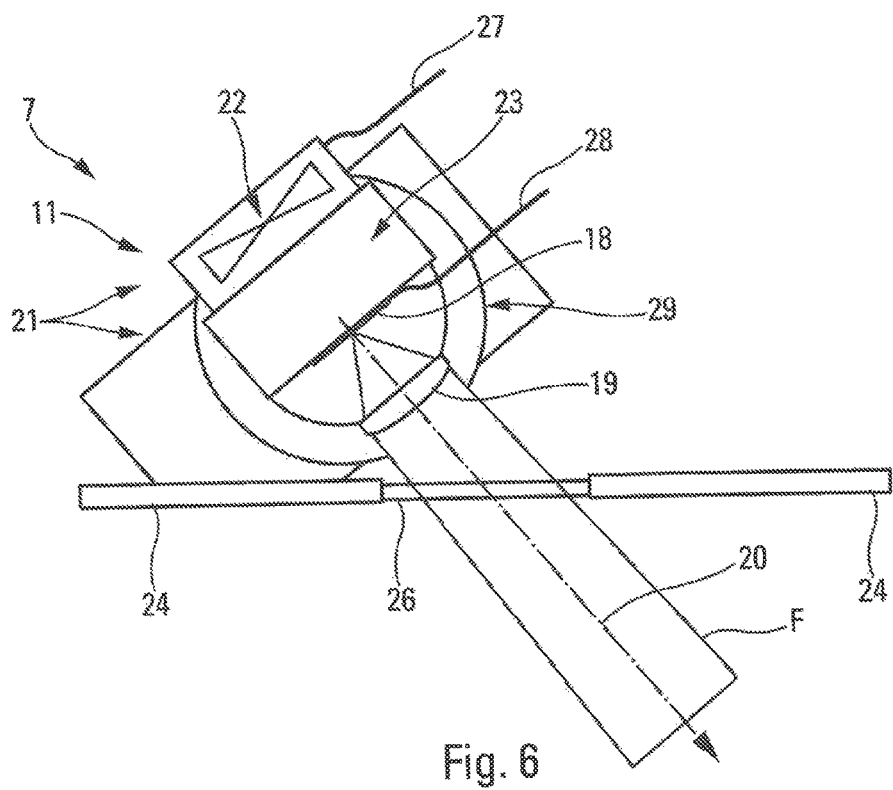

In the examples of FIGS. 5 and 6, the lens 19 makes it possible to modify the direction 20 of the light beam F emitted by the light-emitting diodes mounted on the electronic card 18.

As an illustration, the angle of attack of the light beam F on the blades can be 45°±15°.

As represented on FIGS. 3, 5 and 6, each optical unit 11 also comprises a cooling unit 21.

This cooling unit 21 can comprise, as illustrated on FIGS. 5 and 6, a cooling fan 22 and a conventional cooler 23.

On FIGS. 5 and 6, also represented are:
the side 24 of the pod 6, for example, at an acoustic panel 25 (FIGS. 1 and 2);
a window 26 through which the beam F is emitted. This window 26 is therefore made in a material, which is transparent at least to the wavelength of the beam or beams emitted by the display unit 7; and
parts 27 and 28 of cables intended for the electric power supply and connected, for example, to the source of electric power.

Furthermore, in the particular embodiment of FIG. 6, the optical unit 11 is installed on a spherical element 29 allowing a movement along two axes.

In a first embodiment, illustrated on FIG. 1, the display unit 7 includes a single light ring 8 (represented very schematically), which is arranged in an acoustic panel 25 of the air intake 6. The acoustic panel is formed, in a conventional manner, to reduce the noise generated by the engine 2.

As an illustration, in the embodiment of FIG. 1, each optical unit of the display unit 7 can comprise 9 light-emitting diodes. These diodes, 774 in this case, are mounted on 86 optical units with 3 different longitudinal positions (along the direction defined by the axis X-X). Three light beams F1 to F3 are emitted by the light ring 8, respectively from these three longitudinal positions. In this example, the light ring 8 can comprise, as an illustration:
- 41 optical units for generating the beam F1, which is radially the outermost on the fan 4 in relation to the axis X-X;
- 29 optical units for generating the central beam F2; and
- 16 optical units for generating the beam F3, which is radially the innermost in relation to the axis X-X.

Moreover, in a second embodiment, illustrated on FIG. 2, the display unit 7 includes two light rings 8, arranged, respectively upstream and towards downstream of the acoustic panel 25 of the air intake 6.

A first light ring 8 is positioned at the upstream extremity P1 of the acoustic panel 25. This first light ring 8 is represented on FIG. 2 through an optical unit 11 similar to that of FIG. 5.

The second light ring is positioned at a position P2 towards the downstream extremity of the acoustic panel 25, in this latter. In this example, the light ring 8 (at position P2) is also represented through an optical unit 11 similar to that of FIG. 5.

Furthermore, as an illustration, in this embodiment of FIG. 2, each optical unit 11 can comprise 9 light-emitting diodes. These diodes, 918 in this case, are mounted on 102 optical units at 4 different longitudinal positions (along the direction defined by the axis X-X).

If each longitudinal position includes three rows (3×3 matrix for the 9 light-emitting diodes of each optical unit), 12 rows are therefore available in this example.

In the particular embodiment, represented on FIG. 2, four light beams F4 to F7 are emitted respectively from these four longitudinal positions, namely the beams F4 and F5 by the light ring 8 positioned at P2 and the beams F6 and F7 by the light ring 8 positioned at P1.

As an illustration, in this example, the light ring 8 positioned at P2 can comprise:
- 35 optical units for generating the light beam F4; and
- 29 optical units for generating the light beam F5.

In addition, the light ring 8 positioned at P1 can comprise:
- 23 optical units for generating the light beam F6; and
- 15 optical units for generating the light beam F7.

As a variant, other distributions are possible. For example, the light ring 8 at P2 can be configured to generate only the light beam F4, while the light ring 8 at P1 can be configured to generate the three light beams F5, F6 and F7.

In an embodiment variant (not represented) of the second embodiment, the downstream ring is positioned on the structure of the engine 2 (and not in the acoustic panel 25 as in the example of FIG. 2) according to the characteristics of the engine 2. The structure of the engine 2 protrudes, in fact, more or less into the air intake 6. This embodiment variant makes it possible to preserve the integrity of the acoustic panel 25 and therefore its functions.

Furthermore, the engine assembly 1 comprises at least one window 26, which is transparent to the light beam F emitted by the light-emitting diodes of the display unit 7 (FIGS. 5 and 6). The window or windows is/are arranged on an outside face 30 of the structure of the air intake 6, on its inside periphery facing the fan 4 of the engine 2, as represented for the downstream ring 8 on FIG. 2. The light-emitting diodes are arranged in the thickness of the air intake 6, for example in the acoustic panel 25, and are configured to be able to emit a light beam through the transparent window or windows.

In a particular embodiment, the window is made in plastic (polycarbonate) and the rest of the structure of the display unit 7 is mainly made in aluminum.

In a first embodiment, the engine assembly 1 comprises a continuous window along the acoustic panel, intended for the set of diodes of the display unit.

Moreover, in a second embodiment, the engine assembly 1 comprises several windows with preservation of the structure of the acoustic panel between the windows.

The display unit 7 as described above can be used in numerous applications on an aircraft.

In a first application, the display unit 7 is intended for visually scaring animal species and notably avian species.

In this case, the pilot can trigger the display unit 7 using the actuating unit 14, which is provided on the flight deck, before taking off or on the approach to an airport, for which an avian risk is suspected. Such an on-board scaring system is notably effective during ground proximity phases: during taxiing, on takeoff, in climb, on the approach and on landing.

The diffusion or display of visual scaring signals during taxiing on the ground first and foremost allows the runway to be made safe before takeoff, by reducing and minimizing the risk of collisions. Moreover, the diffusion of visual scaring signals during the initial phase of takeoff and the final phase of landing (below 1500 feet) allows collisions to be limited during the flight phases presenting the main risks of collisions.

In cruise, the pilot can also activate the display unit 7 when an avian risk is indicated (during a migration period, for example).

In a second application, the display unit 7 is intended to display information (in the form of logos, drawings etc.) or signage, on an engine 2 of the aircraft.

In this case, the display unit 7 can be used to display, for example, advertising information with the diffusion of any kind of visual advertising message. It can also be used to display information identifying the aircraft, or the airline company that charters the aircraft.

Furthermore, in a third application, the display unit 7 is used to monitor the blades 5 of the fan 4 of the engine 2 and is combined with means for enabling defects on the blades 5 to be detected following illumination of these latter by the display unit 7.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine assembly comprising:
   an engine and
   a pod surrounding the engine,
   the engine being equipped, upstream according to the direction of entry of air into the engine, with a fan provided with blades,
   said pod having upstream an air intake, said air intake being arranged upstream of the fan, the engine assembly comprising at least one display unit arranged in the air intake,
   said display unit including at least one light ring arranged in the air intake upstream of the fan, said light ring including at least one row of light-emitting diodes and being configured to emit at least one light beam and to project it on the blades of the fan, and,
   wherein the at least one light ring is arranged in an acoustic panel of the air intake.

2. The engine assembly as claimed in claim 1, wherein each row of the light ring includes a plurality of light-emitting diodes, wherein the light emitting diodes of each row form an optical unit.

3. The engine assembly as claimed in claim 2, wherein each of said optical units includes a common electronic card, on which are mounted all the light-emitting diodes of the corresponding optical unit.

4. The engine assembly as claimed in of claim 2, wherein each of said optical units includes a lens configured to manage the orientation of a light beam emitted by the light-emitting diodes of the corresponding optical unit.

5. The engine assembly as claimed in claim 2, wherein each of said optical units includes a cooling unit.

6. The engine assembly as claimed in claim 1, wherein each row of the light ring includes at least four light-emitting diodes, wherein the light emitting diodes of each row form an optical unit.

7. The engine assembly as claimed in claim 1, wherein the display unit includes two light rings arranged, respectively, upstream and towards downstream of an acoustic panel of the air intake.

8. The engine assembly as claimed in claim 1, the display unit further comprising:
   a control unit;
   a source of electric power for the display unit; and
   an actuating unit allowing an operator to act on said control unit.

9. The engine assembly as claimed in claim 1, further comprising at least one window which is transparent to the light beam emitted by the light-emitting diodes, said window being arranged on an outside face of the air intake facing the fan of the engine, the light-emitting diodes being arranged in the thickness of the air intake and configured to be able to emit a light beam through said window.

10. An aircraft comprising:
    at least one engine assembly comprising:
    an engine and
    a pod surrounding the engine,
    the engine being equipped, upstream according to the direction of entry of air into the engine, with a fan provided with blades,
    said pod having upstream an air intake, said air intake being arranged upstream of the fan, the engine assembly comprising:
       at least one display unit arranged in the air intake,
       said display unit including at least one light ring arranged in the air intake upstream of the fan, said light ring including at least one row of light-emitting diodes and being configured to emit at least one light beam and to project it on the blades of the fan, and,
       at least one window which is transparent to the light beam emitted by the light-emitting diodes, said window being arranged on an outside face on the air intake facing the fan of the engine, the light-emitting diodes being arranged in the thickness of the air intake and configured to be able to emit a light beam through said window.

11. An engine assembly comprising:
    an engine and
    a pod surrounding the engine,
    the engine being equipped, upstream according to the direction of entry of air into the engine, with a fan provided with blades,
    said pod having upstream an air intake, said air intake being arranged upstream of the fan, the engine assembly comprising at least one display unit arranged in the air intake,
    said display unit including two light rings arranged, respectively, upstream and towards downstream of an acoustic panel of the air intake, each of said at least two light ring including at least one row of light-emitting diodes and being configured to emit at least one light beam and to project it on the blades of the fan.

* * * * *